United States Patent [19]

Imamura et al.

[11] Patent Number: 4,527,229
[45] Date of Patent: Jul. 2, 1985

[54] FLYBACK TRANSFORMER WITH HIGH VOLTAGE VARIABLE RESISTOR BUILT THEREIN

[75] Inventors: Eiji Imamura, Nonoichi; Toshio Shoji, Nagaokakyo, both of Japan

[73] Assignee: Murata Manufacturing Co., Ltd., Japan

[21] Appl. No.: 533,547

[22] Filed: Sep. 19, 1983

[51] Int. Cl.³ .............................................. H02M 7/06
[52] U.S. Cl. .................................... 363/126; 315/411; 336/96; 363/100
[58] Field of Search .................. 315/1, 3, 206, 207, 315/411; 336/185, 198, 208, 96; 363/126, 144, 146; 323/362

[56] References Cited

U.S. PATENT DOCUMENTS 4,247,889  1/1981  Riechmann ........................ 363/126
4,293,903  10/1981 Mochida et al. ................... 363/146
4,408,176  10/1983 Nakamura ........................ 336/198

Primary Examiner—William H. Beha, Jr.
Assistant Examiner—Jeffrey Sterrett
Attorney, Agent, or Firm—Ostrolenk, Faber, Gerb & Soffen

[57] ABSTRACT

A high voltage variable resistor section (8) for deriving the focusing voltage and screen is attached to an open portion formed on one surface of a first case (47) which receives primary and secondary windings (2, 3) included in a flyback transformer section (1). An insulating substrate (16) on which resistor elements (9-13) included in the high voltage variable resistor section are formed in housed in a second case (15). An opening is formed in one surface of the second insulating cases (15). With this opening communicating with the opening in the first insulating case, the two insulating cases are integrated. These insulating case define insulating case means, in which a high voltage capacitor (14) for compensating cathode ray tube capacity is housed. The high voltage capacitor is disposed between the secondary winding (3) and the resistor elements (9-13) in such a manner that the surfaces of the electrodes (38, 39) of the high voltage capacitor are opposed to the secondary winding (3) and the resistor elements (9-13). This arrangement prevents unnecessary radiation components due to ringing noise induced in the secondary winding from being transferred to the resistor elements and superposed on the focusing voltage.

11 Claims, 18 Drawing Figures

FLYBACK TRANSFORMER WITH HIGH VOLTAGE VARIABLE RESISTOR BUILT THEREIN

BACKGROUND OF THE INVENTION

1. Field of the Invention

This invention relates to a flyback transformer used for supplying high DC voltage to cathode ray tubes as in television sets, and more particularly to a flyback transformer with a high voltage variable resistor built therein for deriving focusing voltage, etc.

2. Description of the Prior Art

The cathode ray tube is supplied with a high DC voltage, as an anode voltage, which has been rectified after being elevated by a flyback transformer. Generally, this anode voltage is divided into medium-high voltages such as focusing voltage and screen voltage. As a voltage divider for obtaining these medium-high voltages, use has been made of a high voltage variable resistor.

Generally, in CRT display devices and high quality television sets required to provide distortionless clear images, it is essential that dynamic regulation be low with respect to a high voltage producing circuit using a flyback transformer. Dynamic regulation means voltage regulation in the duration of one scanning of the screen; if this dynamic regulation is high, distortion will be produced on the screen in a region where contrast is high. For this reason, it has been usual practice to connect a capacitor between the anode electrode of the cathode ray tube and the ground in order to compensate the cathode ray tube capacity so as to provide clear images.

Thus, a certain conventional type of high voltage producing circuit using a flyback transformer comprises the flyback transformer, a high voltage variable resistor, and a high voltage capacitor. An arrangement has already been proposed wherein a flyback transformer and a high voltage variable resistor are assembled as an integral component. In this case, the primary and secondary windings constituting the flyback transformer, and the resistor elements of the high voltage variable resistor are housed in a suitable insulating case, which is filled with insulating resin whereby the voltage-withstanding property of said parts housed in the insulating case is improved.

In the flyback transformer with a high voltage variable resistor built therein as described above, the arrangement for dividing the anode voltage which is a high voltage and deriving the focusing voltage and screen voltage which are medium-high voltages by means of the high voltage variable resistor makes it necessary to increase the resistance values of the resistor elements of the high voltage variable resistor. As a result, the impedance between the ground and the focusing voltage deriving section positioned intermediate between the resistor elements of the high voltage variable resistor becomes high, so that when an unnecessary radiation component due to ringing noise induced in the secondary winding of the flyback transformer rides on the resistor of the focusing voltage deriving section, it will not escape to ground, with the result that it is superposed on the focusing voltage, adversely affecting the screen. There is another form in which the secondary winding of the flyback transformer is divided into parts with a high voltage diode interposed between adjacent parts. In this case, however, an unnecessary radiation component due to noise during the switching of the high voltage diodes is also superposed on the focusing voltage, thus exerting an adverse influence on the screen.

The aforesaid arrangement wherein the primary and secondary windings of the flyback transformer and the resistor elements of the high voltage variable resistor are integrally built in the insulating case has advantages that desired electrical connection between the flyback transformer and the high voltage variable resistor can be made within the insulating case whereby simple wiring suffices in spite of high voltage. There is another advantage that as a whole the arrangement can be reduced in size as compared with an instance in which the flyback transformer and the high voltage variable resistor are constructed as separate parts. However, it is desired to eliminate the aforesaid drawbacks while enjoying these advantages.

SUMMARY OF THE INVENTION

An object of this invention is to provide a flyback power supply with a high voltage variable resistor built therein, wherein unnecessary radiation components rarely tend to be superposed on the focusing voltage deriving section of the high voltage variable resistor.

The flyback power supply with a high voltage variable resistor built therein according to this invention includes the following minimum configuration. It has a flyback transformer including a primary and secondary windings, a high voltage variable resistor having resistor elements connected between the high voltage delivery side of said flyback transformer and the ground, and a high voltage capacitor for compensating cathode ray tube capacity connected between the high voltage delivery side of the flyback transformer and the ground. The high voltage capacitor for compensating cathode ray tube capacity has electrodes located on opposite surfaces of a dielectric body such as a ceramic. Of these components, not only said primary and secondary windings and said resistor elements but also said high voltage capacitor are housed in the insulating case means, and with these components housed in the insulating case means, insulating resin means is injected into the insulating case means; this is a first feature. A second feature of the invention, resides in that the high voltage capacitor is disposed between the secondary winding and the resistor elements, the electrode surfaces of the capacitor intersect the region extending between the secondary winding and the resistor elements. One electrode surface faces toward the windings and the other electrode surface faces toward the resistor elements. According to this invention, the electrode of the high voltage capacitor associated with the ground serves as a shield against unnecessary radiation components which are produced owing to ringing noise induced in the secondary winding of the flyback transformer and, in the type in which high voltage diodes are placed in the secondary winding, unnecessary radiation components due to noise during the switching of the high voltage diodes, preventing them from being transmitted to the resistor elements of the high voltage variable resistor. Therefore, superposition of these unnecessary radiation components on the focusing voltage deriving section of the resistors can be prevented to a great extent. Further, in the instance where the electrode of the high voltage capacitor associated with the high potential side faces toward the secondary winding of the flyback transformer, it is possible to employ such an arrangement that the voltage-withstanding property of the secondary winding and the high voltage capacitor is improved. Further, an arrangement is also possible wherein the secondary winding and the high voltage capacitor are disposed closer to each other. Thus, it contributes advantageously to reducing the size of the flyback transformer. Further, in the instance where the electrode of the high voltage capacitor associated with the high potential side is arranged to face to the secondary winding, its electrode associated with the ground potential necessarily faces to the resistor elements, so that the distance between the electrode associated with the ground potential and the resistor elements is shortened, with the result that the shield effect of the electrode associated with the ground side is improved.

In a preferred embodiment of this invention, the electrodes of the high voltage capacitor are positioned with respect to the resistor elements of the high voltage variable resistor so that said electrodes shield at least the focusing voltage deriving section positioned intermediate between the resistance value between the end of the resistor element connected to the high voltage delivery side of the flyback transformer and the end connected to the ground. This arrangement ensures that at the location where superposition of unnecessary radiation components due to noise from the secondary winding should be avoided, shielding against such unnecessary radiation components is effectively achieved.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
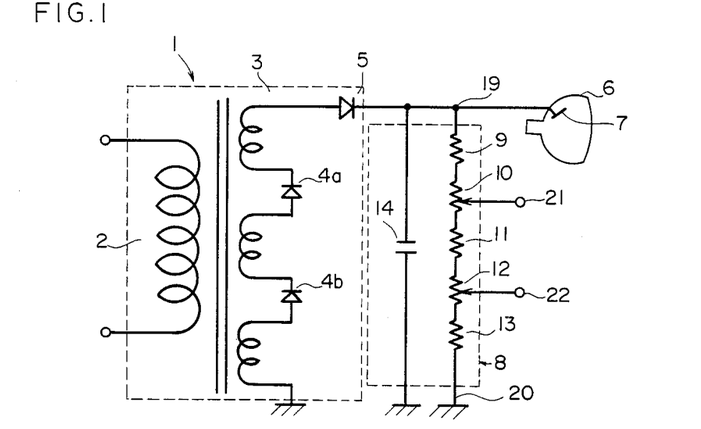
FIG. 1 shows an example of a high voltage producing circuit using a flyback transformer for supplying high voltage to the anode electrode of a cathode ray tube.

Referring to FIG. 1, a high voltage producing circuit using a flyback transformer for supplying a high voltage to the anode electrode 7 of a cathode ray tube 6 will now be described separately with reference to a flyback transformer section 1 and a high voltage variable resistor section 8.

The flyback transformer section 1 comprises a primary winding 2 and a secondary winding 3, and the secondary winding 3 on the higher voltage side is divided by a plurality of high voltage diodes 4a and 4b. One end of the secondary winding 3 is connected to the ground potential and the other end to the anode electrode 7 of the cathode ray tube 6 through a rectifying diode 5.

The high voltage variable resistor section 8 is provided with five resistor elements 9–13 connected in series between the anode voltage delivery side of the secondary winding 3 and the ground, the second and fourth resistor elements 10 and 12 being variable resistor elements. A focusing voltage is derived from one variable resistor element 10, while a screen voltage is derived from the other variable resistor element 12. A high voltage capacitor 14 is connected between the anode electrode 7 and ground.

Figure 2:
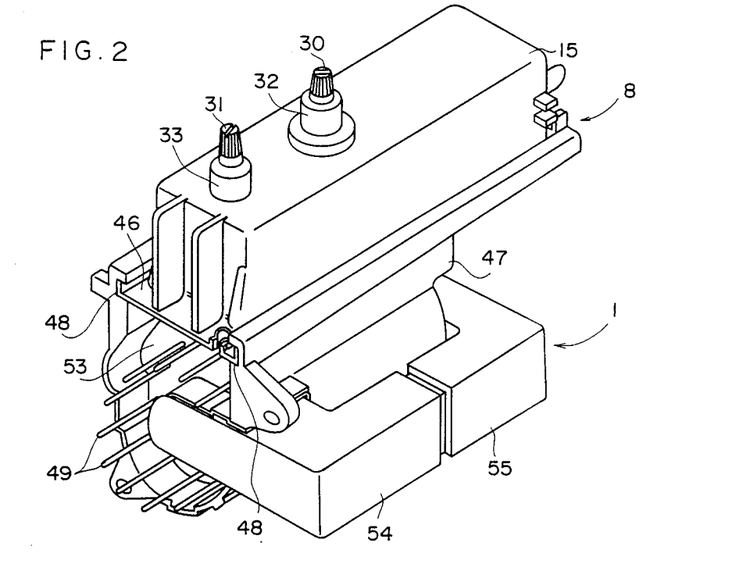
FIG. 2 is a perspective view showing the external appearance of a flyback transformer according to an embodiment of this invention for realizing the high voltage producing circuit of FIG. 1.

FIG. 2 is a perspective view showing the external appearance of a flyback transformer with a high voltage variable resistor built therein for realizing the high voltage producing circuit using the flyback transformer of FIG. 1. In FIG. 2, the high voltage variable resistor section 8 is located in the upper position, while the flyback transformer section 1 is located in the lower position. They are assembled through separate steps and ultimately integrated together as shown in FIG. 2. First, referring to FIGS. 3 through 7, the high voltage variable resistor section 8 will be described.

Figure 4:
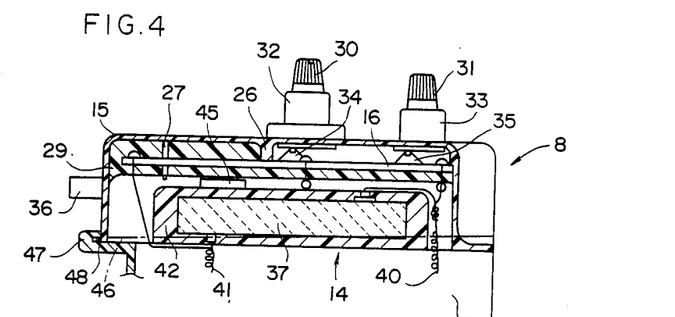
FIG. 4 is a side view, in section, showing the arrangement of FIG. 3.
Figure 5:
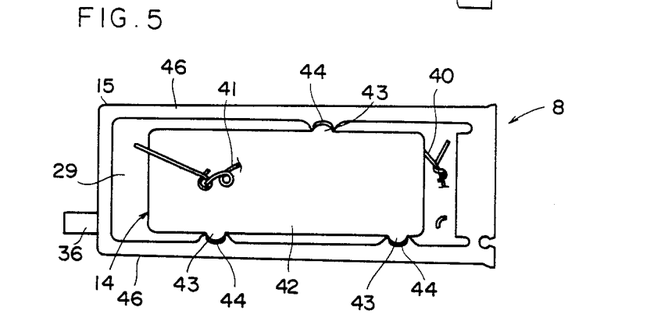
FIG. 5 is a bottom view of the arrangement of FIG. 3.

The high voltage variable resistor section 8 is housed in an insulating case made of resin. The insulating case 15 is open at one side, as shown in FIGS. 4 and 5. That is, in FIG. 4, the lower surface is open. An insulating substrate 16 is housed in the insulating case 15.

Figure 6:
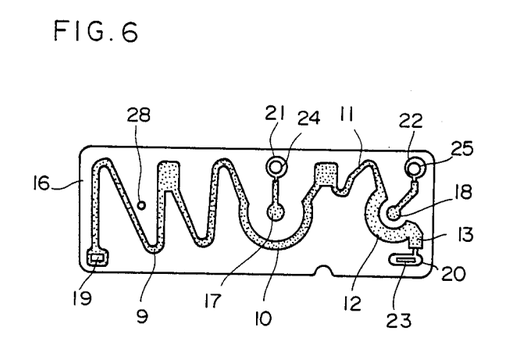
FIG. 6 is a plan view of an insulating substrate shown in FIG. 4.

The insulating substrate 16 is made of alumina or the like, the particulars being shown in FIG. 6. The insulating substrate 16 is quadrangular. One surface of the insulating substrate 16 is formed with film resistors forming the resistor elements 9–13 shown in FIG. 1. To facilitate comparison with the circuit diagram of FIG. 1, the reference numerals used in FIG. 1 are given to the corresponding parts. The film resistor 9 forming the resistor element of the fixed resistor is sinuously formed, followed by the horseshoe-shaped film resistor 10 forming a resistor element of the variable resistor, by the sinuous film resistor 11 forming the resistor element of the fixed resistor, the horseshoe-shaped film resistor 12 forming a resistor element of the variable resistor, and finally by the film resistor 13 forming the resistor element of the fixed resistor. The centers of the regions surrounded by the horseshoe-shaped film resistors 10 and 12 are provided with central electrodes 17 and 18, respectively. The peripheral region of the insulating substrate 16 is provided with terminal electrodes 19, 20, 21, and 22 respectively connected to the film resistors 9 and 13 and central electrodes 17 and 18. Of these terminal electrodes, the terminal electrodes 20, 21, and 22 are formed with throughgoing holes 23, 24, and 25 extending substantially through the centers thereof, respectively, to facilitate electrical connection from the back of the insulating substrate 16. In addition, it is also possible to provide the terminal electrode 19 with a throughgoing hole extending through the insulating substrate 16. In this embodiment, the central electrode 17 and the terminal electrode 21 are connected by a film resistor and so are the central electrode 18 and the terminal electrode 22, whereby they can be made to function as protective resistors. The pattern of the film resistors deposited on the insulating substrate 16 is not limited to the one shown in FIG. 6 but may take any desired form.

Of the reference numerals newly added in the description given above with reference to FIG. 6, those for which the corresponding parts are found in FIG. 1 are applied to these parts in FIG. 1.

The insulating substrate 16 is positioned in the insulating case 15 so that its surface not formed with film resistors is opposed to the open side of the insulating case 15. The insulating substrate 16 is fixed by an adhesive agent on a rib 26 formed in the insulating case 15 to surround the film resistors 10 and 12, whereby a sealed space is defined between the insulating case 15 and the portion of the insulating substrate 16 where the film resistors 10 and 12 forming the resistor elements of the variable resistor are formed. The means for fixing the insulating substrate 16 to the rib 26 is not limited to the aforesaid adhesive agent. For example, mechanical means may be used together with a rubber packing placed on the rib. Further, a pin 27 is set upright in the insulating case 15. The pin 27, as shown in FIG. 6, extends through a hole 28 formed in the insulating substrate 16 to effect the positioning of the latter in the insulating case 15.

With the insulating substrate 16 thus positioned, an epoxy type insulating resin 29 is applied to cover the surface of the insulating substrate 16 not formed with said film resistors and is allowed to cure. The insulating resin 29 is formed up to the side where the film resistors on the insulating substrate are formed, but it is interrupted by a part of the rib 26 positioned at the central portion of the insulating case 15, so that it does not reach the region where the film resistors 10 and 12 for the variable resistor are formed. In addition, it is also possible to employ an arrangement wherein the insulating resin 29 does not at all come around to the side of the insulating substrate 16 where the film resistors are formed. The insulating resin 29 keeps the air-tightness of the clearance between the insulating case and the surface having the film resistors 10 and 12 formed thereon and improves the voltage-withstanding property of the film resistors 9–13 formed on the insulating substrate 16. The insulating resin 29 selected is capable of retaining a suitable amount of flexibility even after curing, thereby absorbing the stress in the insulating substrate 16 to prevent damage to the latter. In addition, the height of said pin 27 serves as a measure of level in applying the insulating resin 29.

The upper wall of the insulating case 15 shown in FIG. 4 is provided with two resistance adjusting rotary shafts 30 and 31 projecting therefrom. One rotary shaft 30 is used for adjusting the focusing voltage and the other rotary shaft 31 for adjusting the screen voltage. These rotary shafts 30 and 31 are rotatably supported in bearings 32 and 33, respectively. The ends of the rotary shafts 30 and 31 located inside the insulating case 15 hold sliders 34 and 35 thereon. The sliders elastically slide on the horseshoe-shaped film resistors 10 and 12 while contacting said central electrodes 17 and 18 in accordance with the rotation of the rotary shafts 30 and 31.

Figure 3:
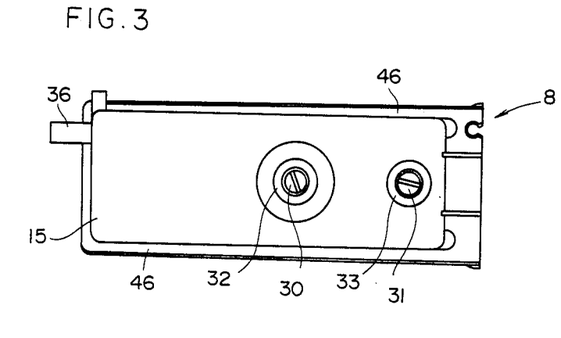
FIG. 3 is a plan view showing the arrangement associated with a variable resistor included in the flyback transformer of FIG. 2.

A passage 36 for leading out the high voltage lead wire for the focusing voltage projects from the left-hand side surface of the insulating case 15 shown in FIGS. 3 through 5.

Figure 7:
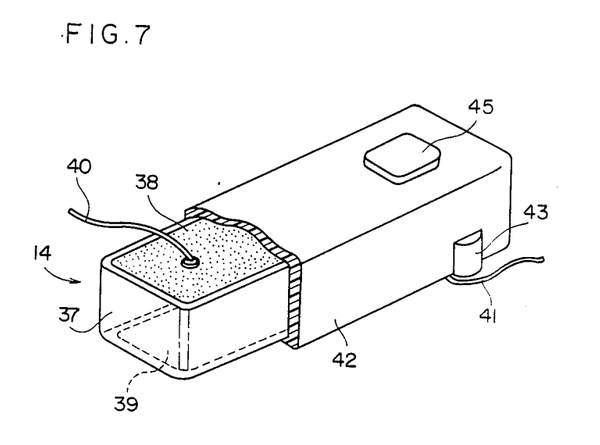
FIG. 7 is a perspective view, partly broken away, of a high voltage capacitor shown in FIG. 4.

The high voltage capacitor 14 is disposed within the insulating case 15 and on the side of the insulating substrate 16 where the film resistors are not formed. The high voltage capacitor 14, as shown in FIG. 7, comprises electrodes 38 and 39 formed on opposite surfaces of a dielectric 37 such as ceramics in the form of a rectangular parallelepiped, said electrodes 38 and 39 having lead terminals 40 and 41 attached thereto. The outer peripheral surface of the high voltage capacitor 14 is covered with an insulating resin 42 such as of the epoxy type. The high voltage capacitor 14 is installed in the insulating case 15 so that its surface with the electrodes 38 and 39 is opposed to the insulating substrate 16. One electrode 39 is connected to the high voltage delivery side of the flyback transformer section 1 in the circuit diagram of FIG. 1 and is at a higher potential than the other electrode 38, said higher potential electrode 39 being opposed to the open side of the insulating case 15. It is also possible to position the high voltage capacitor so that the other electrode 38 is opposed to the open side of the insulating case 15.

The high voltage capacitor 14 is positioned with respect to, e.g., the insulating case 15. Thus, as shown in FIGS. 5 and 7, the outer surface of the insulating resin 42 is integrally provided with three projections 43 arcuately projecting therefrom, while three recesses 44 are formed in the inner surface of the insulating case 15 at the correspondinq positions. These projections 43 fit in the recesses 44, whereby the high voltage capacitor 14 is positioned within the insulating case 15. The shape of the projections 43 can be easily obtained by imparting the corresponding shape to the mold when making the insulating resin 42 by molding.

The insulating resin 42 may be formed with a step 45. This step 45 is formed by adhesively bonding an insulating chip, such as ceramics, to the surface of the electrode 38 on the dielectric 37 and serves to position the dielectric 37 inside the mold when molding the insulating resin 42. Further, as shown in FIG. 4, the step 45 can be used to define a clearance so that the lead terminal 40 led out of the same side as the step 45 is led out to the open side of the insulating case 15 through the space between the insulating resin 29 and the insulating resin 42.

In this manner, the parts constituting the high voltage variable resistor section 8 shown in FIG. 1 are obtained. In addition, FIGS. 4 and 5 and FIG. 8 to be later described show lead wires for electrical connection, but these are shown only diagrammatically and it is desirable to refer to FIG. 1 for the correct wiring.

The aforesaid high voltage variable resistor section 8, as shown in FIG. 2, is built in the flyback transformer section 1 and connected to the high voltage delivery side of the flyback transformer.

The insulating case 15 of the high voltage variable resistor section 8 is formed with a flange 46, while the insulating case 47 of the flyback transformer section 1 is formed with a U-shaped groove 48 to slidably receive said flange 46. One end of the groove 48 is closed as shown at left in FIGS. 4 and 8, while the other end of the groove 48 is open as shown at left in FIG. 2. Thus, by inserting the flange 46 into the groove 48 from the left-hand side in FIG. 2 (i.e., the right-hand side in FIGS. 4 and 8), the insulating case 15 and the insulating case 47 are mechanically fixed. In addition, in order to facilitate the insertion of the flange 46 into the groove 48 and to make reliable the fixing of the insulating cases 15 and 47, the flange 46 is tapered as shown in a dash-dot line in FIG. 4 and, as can be analogized from FIG. 2, the groove 48 is also tapered.

Figures 8, 9, 10, 11:
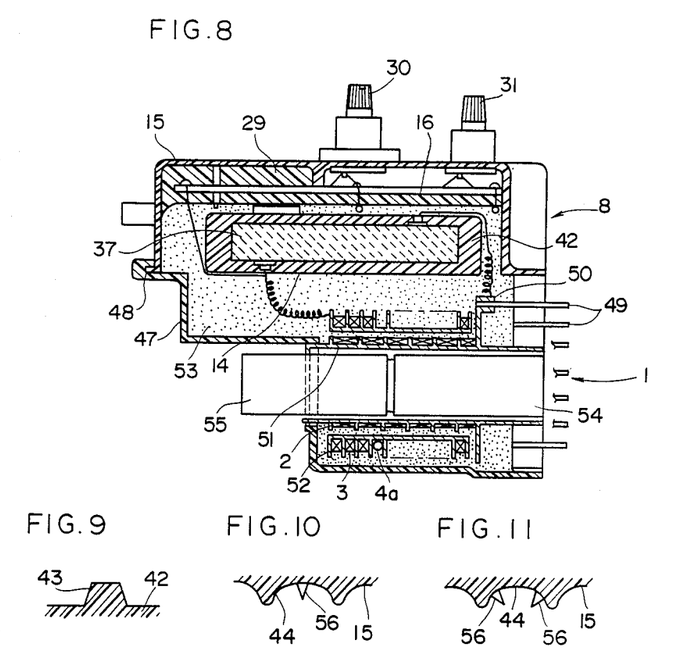
FIG. 8 is a sectional view showing the internal construction of the flyback transformer of FIG. 2.
FIG. 9 shows a modification of projections formed on the high voltage capacitor.
FIGS. 10 and 11 show modifications of recesses formed in an insulating case.

Referring to FIGS. 2 and 8, the arrangement of the flyback transformer section 1 will be described. A low voltage bobbin 51 integral with a terminal block 50 having a plurality of pin terminals 49 attached thereto has the primary winding 2 shown in FIG. 1 wound thereon. A high voltage bobbin 52 is disposed to surround the low voltage bobbin 51. The high voltage bobbin 52 has the secondary winding 3 shown in FIG. 1 wound thereon. Of the high voltage diodes 4a and 4b dividing the secondary winding into three parts, the high voltage diode 4a is shown in FIG. 1 as placed on the high voltage bobbin 52. Though not shown, the low voltage bobbin 51 may have a tertiary winding together with the primary winding wound thereon, as occasion demands.

After predetermined electrical connection has been made between the flyback transformer section 1 and the aforesaid high voltage variable resistor section 8, an insulating resin 53 such as of the epoxy type is charged into the space between the insulating cases 15 and 47 and allowed to cure. Further, a pair of U-shaped cores 54 and 55 are disposed end to end.

In the aforesaid arrangement, as best shown in FIG. 8, the high voltage capacitor 14 for compensating the capacity of the cathode ray tube connected between the anode electrode of the cathode ray tube and the ground is interposed between the secondary winding 3 and the film resistors 9-13 (FIG. 6) formed on the insulating substrate 16. Particularly, the higher potential electrode 39 (FIG. 7) of the high voltage capacitor 14 is opposed to the secondary winding, while the lower potential electrode 38 (FIG. 7) is opposed to the film resistors 9-13. The electrodes 38 and 39 of the high voltage capacitor 14 are positioned so that they shield at least the film resistor 10 constituting a resistor element of the variable resistor which is a part having a high impedance between the terminal electrode 19 on the input side of the series of film resistors 9-13 and the terminal electrode 20 providing the ground potential. In this way, the tendency that unnecessary radiation components due to noise at the time of switching of the high voltage diodes 4a and 4b and due to ringing noise induced in the secondary winding 3 are superposed on the focusing voltage delivery side can be effectively reduced.

FIG. 9 shows a modification of a projection 43 formed on the insulating resin 42 covering the high voltage capacitor 14. As shown in this figure, the projection 43 may be trapezoidal. Further, though not shown, it may take any other shape.

FIGS. 10 and 11 show modifications of recesses 44 formed in the insulating case 15. As shown in these figures, the recesses 44 are formed with a rib or ribs 56 projecting at an acute angel (preferably 30 degrees or less). In FIG. 10, a single rib 56 is formed, and in FIG. 11 two ribs 56 are formed. When the projections 43 fit in the recesses 44, the ribs 56 are suitably deformed to make firmer the engagement between the projections 43 and the recesses 44.

Figure 12:
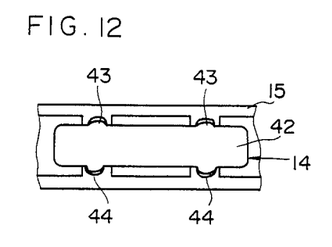
FIG. 12 shows another example illustrating the state in which the high voltage capacitor is positioned with respect to the insulating case.

FIG. 12 shows another example of the positioning of the insulating case 15 and the insulating resin 42 covering the high voltage capacitor 14. In the example shown in FIG. 12, four sets of combinations of projections 43 and recesses 44 are provided. That is, what is intended to mean in this example is that the number of combinations of projections 43 and recesses 44 is optional and that the position where these projections 43 and recesses 44 are to be formed is optional.

Figure 13:
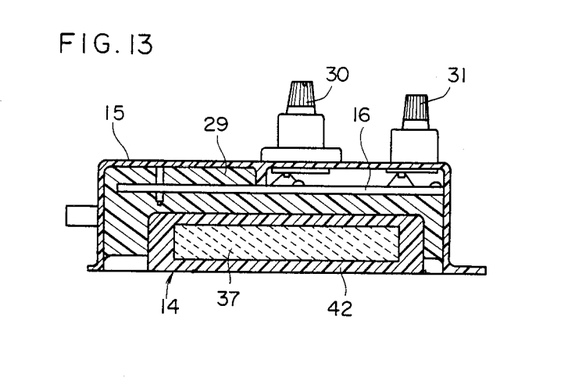
FIG. 13 shows a further example illustrating the state in which the high voltage capacitor is positioned with respect to the insulating case.

FIG. 13 shows another example of the positioning of the high voltage capacitor 14 with respect to the insulating case 15. In this example, the amount of the insulating resin 29 to cover the insulating substrate 16 is increased so as to embed at least part of the high voltage capacitor 14, and the high voltage capacitor 14 is positioned by this insulating resin 29. In this case, the insulating resin 42 for covering the high voltage capacitor 14 is shown in FIG. 13, but this insulating resin 42 may be removed and instead the insulating resin 29 may be used to cover the high voltage capacitor 14 at the same time.

The high voltage capacitor 14 may be positioned by being supported from the high voltage bobbin 52 included in the flyback transformer section 1. Some examples of such positioning method are given below.

Figure 14:
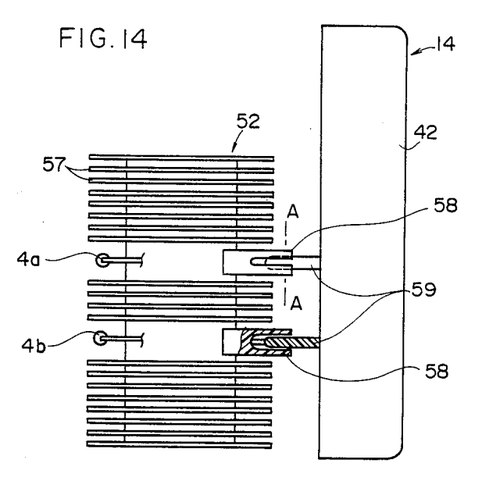
FIG. 14 shows a first example illustrating the state in which the high voltage capacitor is positioned with respect to a high voltage bobbin.
Figure 15:
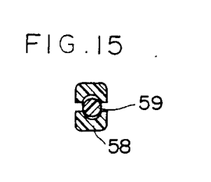
FIG. 15 is a sectional end view taken along the line A—A in FIG. 14.

Referring to FIG. 14, the high voltage bobbin 52 is provided with a plurality of flanges 57 for guiding and controlling the winding operation of the secondary winding 3 (not shown in FIG. 14). However, in the regions where the aforesaid high voltage diodes 4a and 4b are disposed, the distance between adjacent flanges 57 is increased to accommodate the high voltage diodes 4a and 4b. These relatively increased spaces between adjacent flanges 57 are utilized to form socket-like portions 58 on the high voltage bobbin 52. On the other hand, the insulating resin 42 for covering the high voltage capacitor 14 is formed with plug-like portions 59 to be received in the socket-like portions 58. Each socket-like portion 58 has its front end bifurcated to receive the plug-like portion 59 in the bifurcation so as to elastically hold the plug-like portion 59. In this manner, the high voltage capacitor 14 is positioned with respect to the high voltage bobbin 52.

Figure 16:
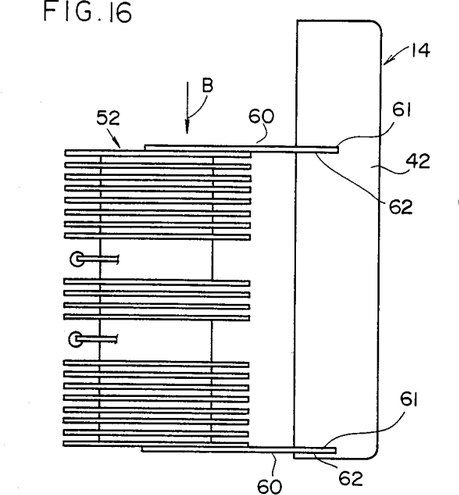
FIG. 16 shows a second example illustrating the state in which the high voltage capacitor is positioned with respect to the high voltage bobbin.
Figure 17:
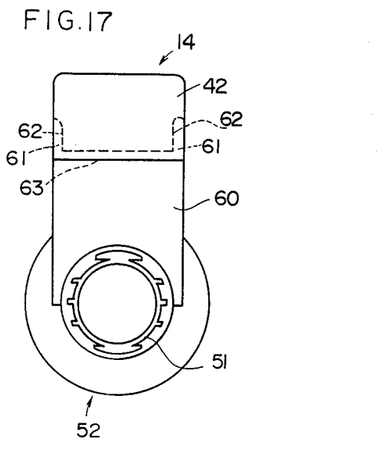
FIG. 17 is a view looking at FIG. 16 in the direction of arrow B.

In an example shown in FIGS. 16 and 17, positioning members 60 are provided, extending from the opposite end surfaces of the high voltage bobbin 52, each positioning member 60 having a pair of holder elements 61 formed on the front end thereof. On the other hand, opposite surfaces of the insulating resin 42 for covering the high voltage capacitor 14 are formed with grooves 62 for receiving the aforesaid holder elements 61. In addition, in this example, the grooves 62 formed in opposite surfaces are interconnected by a connecting groove 63 formed in the insulating resin 42, and a portion of the positioning member 60 fits in said connecting groove 63. However, such connecting grooves 63 are not always necessary. The elasticity of the material of which the positioning members 60 are made acts to cause the holder elements 61 to elastically hold the insulating resin 42, whereby the high voltage capacitor 14 is positioned with respect to the high voltage bobbin 52.

Figure 18:
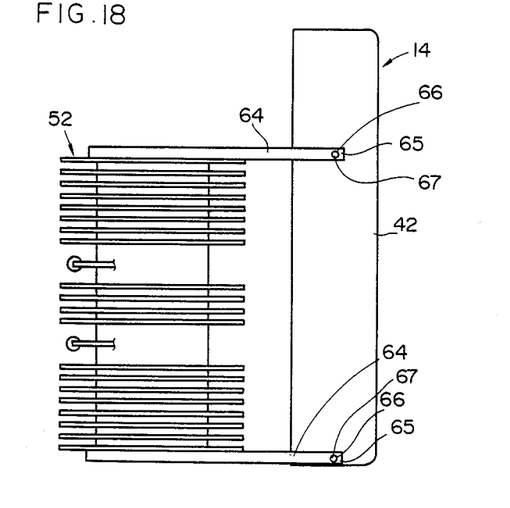
FIG. 18 shows a third example illustrating the state in which the high voltage capacitor is positioned with respect to the high voltage bobbin.

In an example shown in FIG. 18, positioning members 64 similar in shape to the positioning members 60 of FIG. 16 are provided, extending from the end surfaces of the high voltage bobbin 52. The positioning members 64 are each formed with a pair of holder elements 65. Each holder element 65 is formed with a hole 66. On the other hand, the insulating resin 42 for covering the high voltage capacitor 14 is formed with projections 67 to be received in the holes 66. Thus, the high voltage capacitor 14 is positioned with respect to the high voltage bobbin 52 in that the projections 67 are received in the holes 66. In addition, in the example shown in FIG. 18, grooves corresponding to the grooves 62 shown in the example illustrated in FIGS. 16 and 17 may be formed in the insulating resin 42.

The method of positioning the high voltage capacitor 14 has been described so far by giving various examples, but other modifications are possible. For example, as shown in FIG. 5, in order to position the high voltage capacitor 14 with respect to the insulating case 15, projections 43 are formed on the high voltage capacitor 14 and recesses 44 are formed in the insulating case 15, but this may be reversed; that is, projections may be formed on the insulating case and recesses may be formed in the high voltage capacitor.

The positioning of the high voltage capacitor 14 is in any sense temporary, being effective until the insulating resin 53 (FIG. 8) is charged into the insulating cases 15 and 47. Therefore, the positioning is not required to be so accurate and may be only to the extent of preventing deviation of the high voltage capacitor 14. That is, the high voltage capacitor 14 will be completely fixed in position by the insulating resin 53 to be subsequently charged.

Further, the insulating case means to be provided for the flyback transformer need not be divided into the first and second case portions (insulating case 15 and insulating case 47) to be joined together, and instead it may be an integral insulating case.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A flyback power supply comprising: flyback transformer means having primary and secondary windings, high voltage variable resistor means having resistor elements connected between a high voltage side of said flyback transformer means and a ground thereof, a high voltage capacitor for compensating the capacity of a cathode ray tube connected between the high voltage side of said flyback transformer means and said ground, insulating case means for housing said primary and secondary windings and said resistor elements, and insulating resin means which are injected into said insulating case means, said high voltage capacitor being located in said insulating case means and being arranged between said secondary winding and said resistor elements, said capacitor having first and second electrodes having, respectively, first and second electrode surfaces which intersect the region located between said secondary winding and said resistor elements.

2. A flyback power supply as set forth in claim 1, wherein said first electrode surface of said high voltage capacitor faces toward said secondary winding and said second electrode surface faces toward said resistor elements.

3. A flyback power supply as set forth in claim 1, said resistor elements include a film resistor element constituting a variable resistor portion for deriving a focusing voltage and wherein the position of said electrodes of said high voltage capacitor with respect to said resistor elements is selected to at least shield the position of said film resistor element.

4. A flyback power supply as set forth in claim 1, wherein said insulating case means comprises first and second case portions to be joined together, said primary and secondary windings are housed in the first case portion and said resistor elements and said high voltage capacitor are housed in the second case portion.

5. A flyback power supply as set forth in claim 4, wherein said insulating resin means includes a first insulating resin for covering said high voltage capacitor and said high voltage capacitor is positioned with respect to said second case portion to permit projections formed on either the outer surface of said first insulating resin or the inner surface of said insulating case to fit into recesses formed in the other of said inner or outer surface.

6. A flyback power supply as set forth in claim 4, wherein said resistor elements are formed on an insulating substrate said insulating resin means includes a second resin for covering said insulating substrate, and said high voltage capacitor is fixed in position by said second insulating resin.

7. A flyback power supply as set forth in claim 1, wherein said secondary winding is wound on a high voltage bobbin which is positioned to surround said primary winding.

8. A flyback power supply as set forth in claim 7, wherein said insulating resin means includes an insulating resin for covering said high voltage capacitor and said high voltage capacitor is positioned to permit positioning members extending from said high voltage bobbin to engage part of said insulating resin.

9. A flyback power supply as set forth in claim 8, wherein said insulating resin includes a plurality of plug-like portions and said positioning members are provided with a plurality of socket-like portions for elastically holding and receiving said plug-like portions.

10. A flyback power supply as set forth in claim 8, wherein said insulating resin comprises opposite surfaces and grooves in said opposite surfaces and said positioning members include a pair of holder elements for holding said insulating resin while fitting in the grooves of said opposite surfaces.

11. A flyback power supply as set forth in claim 8, further including projections formed on opposite surfaces of said insulating resin, said positioning members being provided with a pair of holder elements, each holder element being formed with holes for receiving said projections.

* * * * *